J. B. MOODY.
ADDING MACHINE.
APPLICATION FILED SEPT. 22, 1913.

1,116,461.

Patented Nov. 10, 1914.
5 SHEETS—SHEET 1.

WITNESSES:
R. E. Bruckner.
Wm. Bruckner.

INVENTOR
Jason B. Moody.
BY John W. Spellman.
ATTORNEY

J. B. MOODY.
ADDING MACHINE.
APPLICATION FILED SEPT. 22, 1913.
1,116,461.
Patented Nov. 10, 1914.
5 SHEETS—SHEET 2.
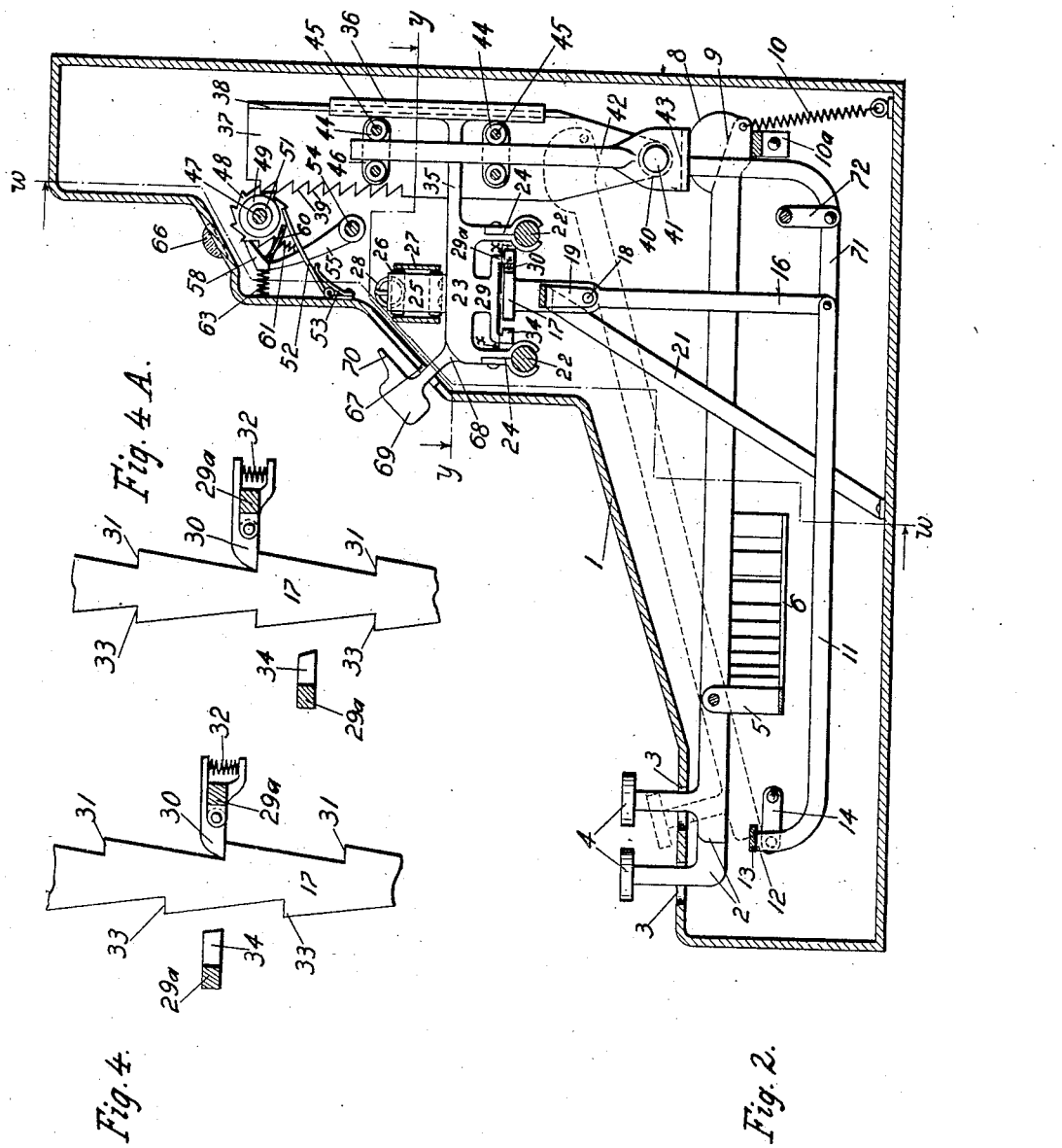
WITNESSES:
INVENTOR
Jason B. Moody.
ATTORNEY

J. B. MOODY.
ADDING MACHINE.
APPLICATION FILED SEPT. 22, 1913.

1,116,461.

Patented Nov. 10, 1914.
5 SHEETS—SHEET 3.

WITNESSES:

INVENTOR
Jason B. Moody.
BY
ATTORNEY

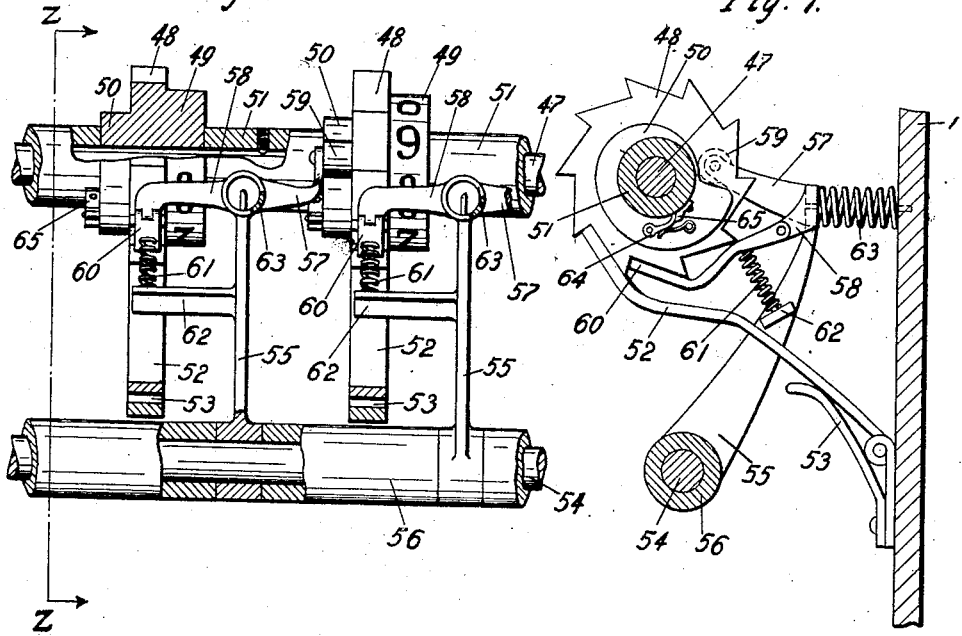
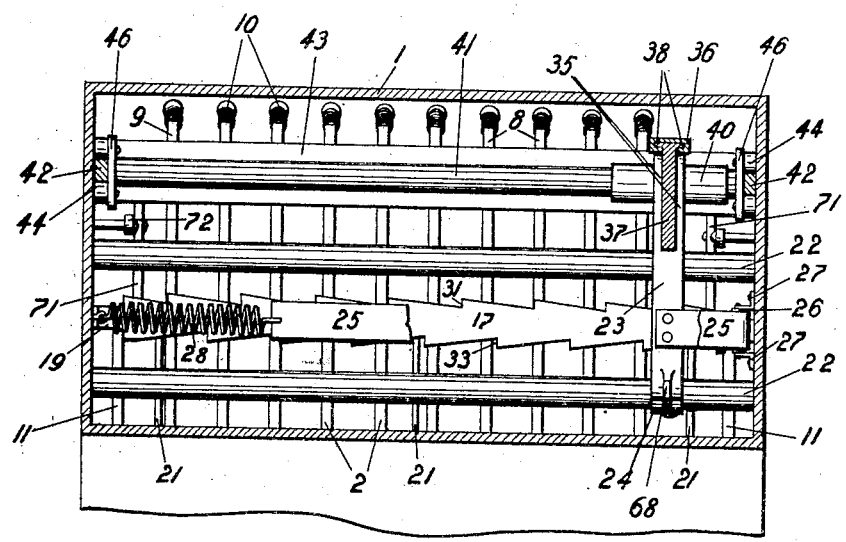

J. B. MOODY.
ADDING MACHINE.
APPLICATION FILED SEPT. 22, 1913.

1,116,461.

Patented Nov. 10, 1914.
5 SHEETS—SHEET 5.

WITNESSES:
R. E. Bruckner.
Wm. Bruckner.

INVENTOR
Jason B. Moody.
BY John M. Spellman.
ATTORNEY

UNITED STATES PATENT OFFICE.

JASON B. MOODY, OF DALLAS, TEXAS.

ADDING-MACHINE.

1,116,461.   Specification of Letters Patent.   Patented Nov. 10, 1914.

Application filed September 22, 1913. Serial No. 791,058.

*To all whom it may concern:*

Be it known that I, JASON B. MOODY, citizen of the United States, residing at Dallas, in the county of Dallas and State of Texas, have invented certain new and useful Improvements in Adding-Machines, of which the following is a specification.

My invention relates to adding machines, and particularly relates to that class of adding machines which embody no printing mechanism but consecutively add the numbers of a sum upon key actuated accumulating wheels, finally registering upon said wheels the desired total.

My invention is further classified as having ten keys each of which is adapted to actuate any one of several accumulating wheels by employing a transmission mechanism for each key one element of which is common to all and is mounted upon a carriage so that it may be adjusted to form a part of any of the key actuated mechanism.

It is the object of my invention to provide a novel carriage for mounting the movable element of the several transmission mechanisms, the novelty consisting in so mounting said element that it may perform its proper function in each of its various positions of adjustment.

Finally, the object of my invention is to provide a device of the character described, that will be strong durable, simple and efficient, and comparatively easy to construct, and also one, the various parts of which will not be likely to get out of working order.

Figures 1, 1A:
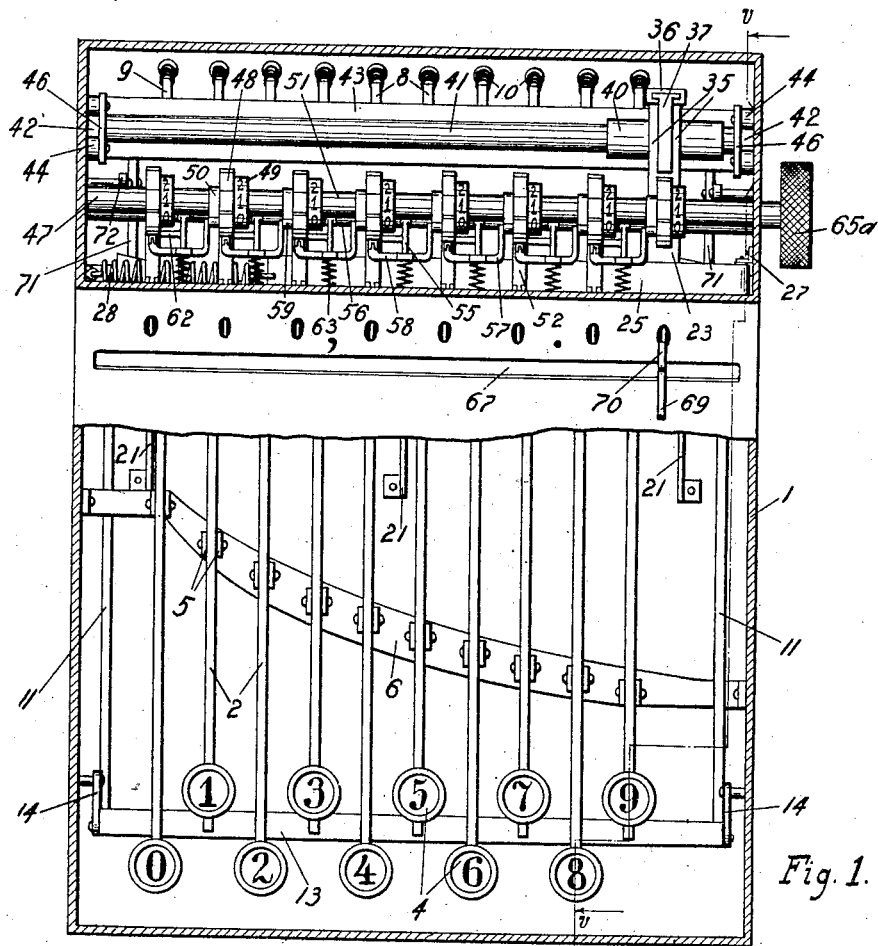
Figure 3:
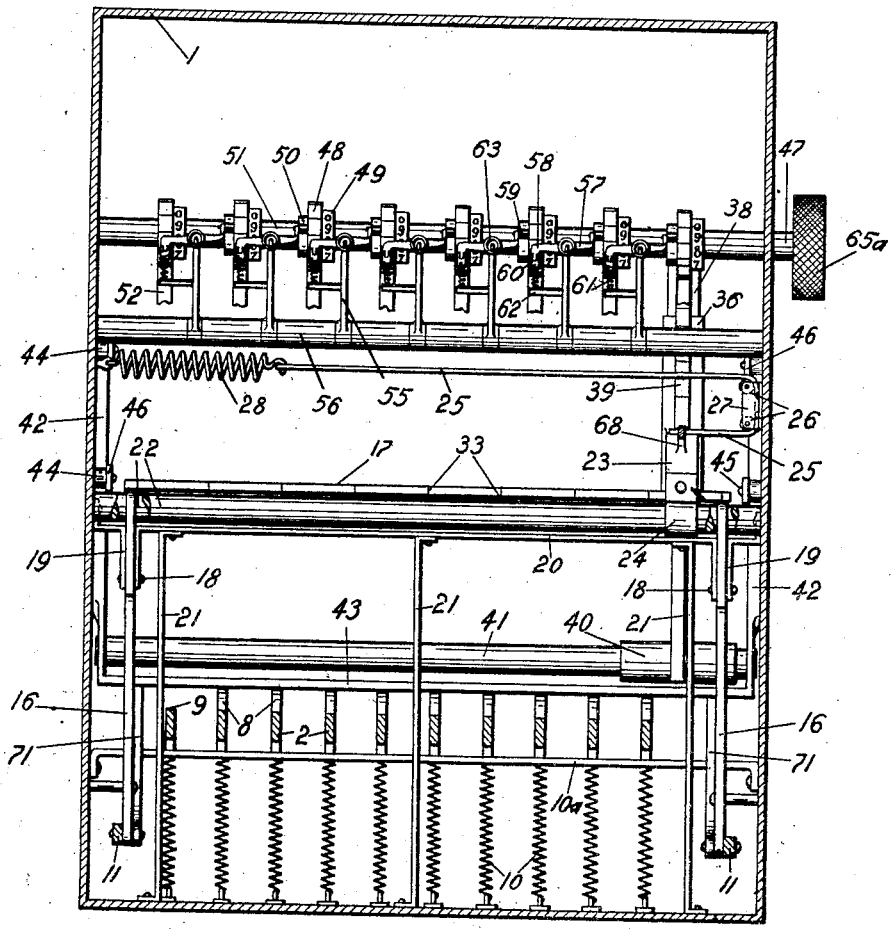
Figure 8:
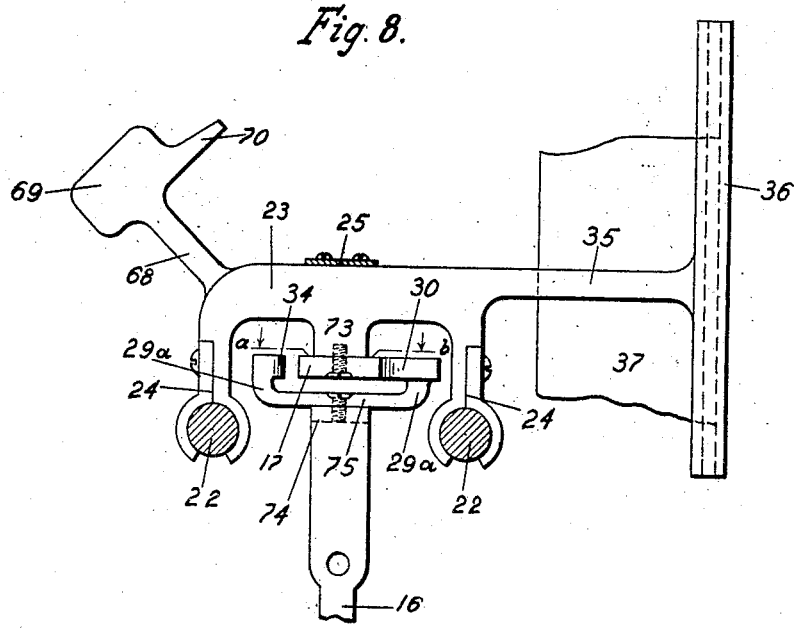
Figure 9:
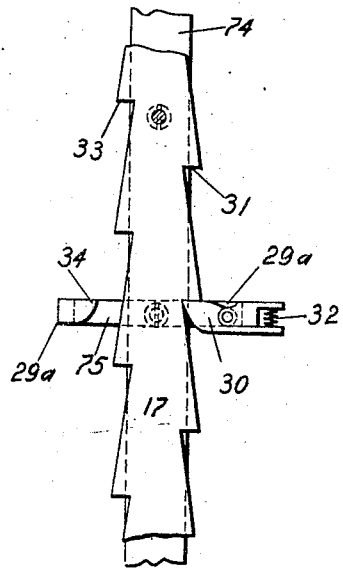

With these and other various objects in view, my invention has relation to certain novel features of the construction and operation, an example of which is described in the following specification and illustrated in the accompanying drawings, wherein:

Figure 1 is a plan view of my adding machine, the top of the casing containing the machine being broken away, with the exception of a small portion. Fig. 1ª is a top view of the upper portion of my machine. Fig. 2 is a vertical sectional view of the machine, the section being taken upon the line $v$—$v$ of Fig. 1. Fig. 3 is a vertical sectional view, the section being taken upon the line $w$—$w$ of Fig. 2. Fig. 4 is a detail sectional view of the escapement, the section being taken upon the line $x$—$x$ of Fig. 2. Fig. 4ª is a view similar to Fig. 4 showing a modification of my escapement. Fig. 5 is a horizontal sectional view, the section being taken upon the line $y$—$y$ of Fig. 2. Fig. 6 is a detail front view of the accumulating mechanism. Fig. 7 is a vertical sectional view of the same, the section being taken upon the line $z$—$z$ of Fig. 6. Fig. 8 is a view in side elevation showing a modified form of my escapement. Fig. 9 is a horizontal view of the same, the section being taken upon the line $a$—$b$ of Fig. 8.

Referring now more particularly to the drawings, wherein like reference characters designate similar parts in all the figures, the numeral 1 denotes the casing of my machine, which will preferably be formed of sheet metal, suitably shaped to accommodate the inclosed mechanism. In the bottom portion of the casing 1, there are mounted ten key bars 2 parallel to each other and to the side walls of the casing, and normally occupying a horizontal position. The arrangement and mounting of the key bars is best illustrated in Figs. 1 and 2. The forward extremities of the bars 2 are turned upwardly through apertures 3 in the casing 1, and are respectively surmounted by keys 4. The keys 4 carry numbers ranging from zero to nine, inclusive, and will preferably form two rows transverse of the casing, one row carrying the odd numbers of the series and the other the even numbers. It is furthermore preferred to so number the keys that they will consecutively increase in number from left to right of the series. The key bars 2 are respectively pivoted between pairs of brackets 5 rigidly extending from a horizontal bar 6, secured at its extremities to the side walls of the casing, and curving gradually toward the rear of the casing from right to left thereof. The rear ends of the bars 2 are transversely alined and lie adjacent to the rear wall of the casing. Owing to the curvature of the bar 6, the distances from the pivot points of the key bars to their rear ends gradually increase from left to right of the series, the left-hand key bar being pivoted adjacent to its middle, and the right-hand bar near its forward extremity. Each of the bars 2, except that which carries the zero key, has formed upon its rear extremity an integral upstanding projection 8 of substantially semicircular shape. The function of the members 8 will presently be made clear. The bar 2 which carries the zero key has its upper edge beveled at its rear end as is indicated by the numeral 9. The rear extremity of each key-bar is connected with the floor of the casing by a coiled spring 10, which serves to return the bar to its normal horizontal position, after the bar has been subjected to an angular displacement. The motion which any bar 2 may undergo in returning to its normal position is limited by a stop-bar 10ª extending beneath the rear ends of the bars 2, and secured at its extremities to the side walls of the casing.

Beneath the series of key-bars is mounted a swinging frame (see Figs. 1 and 2), comprised of a pair of bars 11 respectively parallel and adjacent to the side walls of the casing, and normally horizontal, the forward extremities of said bars being turned upwardly as indicated at 12, and connected by a horizontal bar 13 extending transversely beneath the forward extremities of the key bars a short distance beneath the same. The forward end of the frame comprising the parts 11, 12 and 13, has a swinging connection with the side walls of the casing through a pair of links 14, which when the frame is in its normal position are horizontal. The bars 11 respectively have pivotal connection at their rear ends with the lower extremities of two normally vertical bars 16. The upper extremities of the bars 16 are integrally connected by a bar 17 parallel to the rear wall of the casing. The members 16 and 17 are best shown in Figs. 2, 3 and 9. The bar 17 has formed upon its front and rear edges two racks of ratchet teeth respectively designated by the numbers 31 and 33, the teeth of one rack being staggered in their relation to those of the other. The bars 16 are pivoted adjacent to their upper extremities as indicated at 18, the outer ends of the pivot pins 18 being supported by brackets 19 mounted upon the casing side walls, and the inner ends of said pins being supported by the down turned extremities of a bar 20 parallel to the bar 17 and spaced beneath the same. The bar 20 is rigidly supported from the bottom of the casing by three or more legs 21. The upper extremities of the bars 16 respectively project between the ends of two guide rods 22, rigidly supported by the side walls of the casing. Upon said guide rods, a carriage 23 is adapted to undergo sliding travel, said carriage being provided with composite legs 24 loosely engaging the guide rods at their lower ends. For the best illustration of said carriage and the parts intimately associated therewith, see Figs. 3, 8 and 9. To said carriage is secured one extremity of a flexible tape or ribbon 25 preferably formed of steel, which ribbon is carried from the carriage over two rollers 26 mounted between a pair of brackets 27 secured to the right side wall of the casing. After passing over said rollers, the ribbon is extended toward the left side wall of the casing, and has connection with said wall through a spring 28. When the carriage is moved from right to left of the casing, the spring 28 is extended, and the retractile force of the spring acting upon the carriage through the ribbon 25 tends constantly to return the carriage to its right-hand limiting position of travel. Just above the bar 17, a bracket 29 is integrally formed upon said carriage, and said bracket is formed with opposite integral depending fingers 29ª respectively spaced from the lateral edges of the bar 17. Upon the rearmost of the fingers 29ª, there is pivoted a pawl 30 which is adapted to engage the ratchet teeth 31 formed upon the rear edge of the bar 17. The teeth of the rack 31 are so formed that when one of them is engaged by the pawl 30, the carriage 23 will be withheld from yielding to the force exerted upon said carriage by the spring 28. When the carriage is being manually displaced from right to left of the casing, the pawl 30 may swing about its pivot so as to offer no impediment to the travel of the carriage, but a coiled spring 32 connecting the pawl with the correlated finger 29ª tends to instantly return the pawl to its normal position when the latter is momentarily spaced from the adjacent rack. The number of teeth embodied in each of the two racks 31 and 33 must be equal to the number of figures comprising the maximum total the machine is designed to secure. Since the drawings illustrate a machine designed to secure a total containing as many as eight figures, this number of teeth are embodied in the two racks. Upon the front finger 29ª there is formed a rigid pawl 34, which may engage the rack 33 when the bar 17 is subjected to a slight forward displacement. The condition under which the bar 17 is shifted forwardly or rewardly will later be fully explained.

With the carriage 23 is integrally formed a pair of spaced rearwardly extending arms 35, which serve to rigidly support at their rear ends a vertical guide member 36. The member 36 serves to accurately guide the vertical sliding displacement of the rack bar 37, which passes between the arm 35, and is formed adjacent to its rear edge with a pair of laterally extending flanges 38 entering the guide member 36 and increasing the accuracy with which the rack bar is limited by the guide member to vertical displacement. The teeth 39 of the rack bar are formed upon the upper portion of the front edge of said bar and are of ratchet shape. The teeth comprising the rack 39 should be not less than nine in number. The bar 37 has integrally formed upon its lower extremity a sleeve 40 which loosely engages a horizontal slide rod 41, parallel to the rear wall of the casing. The extremities of the rod 41 are respectively rigidly mounted in the enlarged lower end of two vertical guide bars 42, respectively disposed in contact with the side walls of the casing. The lower ends of the bars 42 are rigidly connected by a bar 43 parallel to the rod 41 and disposed a short distance beneath said rod. The members 41, 42 and 43 together form a rigid frame which normally rests upon the projections 8 formed upon the rear ends of the bars 2, so that the manipulation of any keybar will communicate an upward displacement to said frame, which through its own weight returns to its normal position as the displaced key-bar returns. The rack-bar 37 will of course share in any vertical displacement communicated to said frame owing to the mounting of the sleeve 40 upon the rod 41. Each guide bar 42 is engaged between two vertically spaced pairs of rollers 44, which rollers are journaled upon pins 45 mounted in the adjacent side walls of the casing. The free end of each pair of pins 45 support the extremities of a plate 46, the correlated bar 42 being passed between said plate and the adjacent side wall. Thus the extremities of the frame comprising the parts 41, 42 and 43 are accurately guided during vertical displacement of said frame, so that the latter will have no tendency to bind during such displacement.

In the upper portion of the casing 1, a stationary horizontal shaft 47 is mounted parallel to the rear casing wall, the extremities of said shaft being rotatably mounted in the side walls of the casing. Upon the shaft 47, there is mounted a plurality of equally spaced revoluble members (Figs. 6 and 7), each member comprising a ratchet wheel 48, an accumulating wheel 49, and a cam 50. The parts 49 and 50 of each member will preferably be formed integral with the correlated part 48 at each side thereof. The number of said members should be equal to the number of teeth comprising the rack 31, and will determine the number of figures entering into the maximum total that may be obtained upon the machine. Said revoluble members are held in a proper spaced relation by a plurality of sleeves 51 fast upon the shaft 47. Through a sliding displacement of the carriage 23, the rack 31 may be adapted to engage any one of the ratchet wheels 48, so as to produce rotation of the member in which the engaged ratchet wheel is embodied, when subjected to an upward vertical displacement. It is essential that the direction of rotation of the revoluble members be always the same, and to prevent any reverse rotation of such members, each ratchet wheel 48 is engaged by a pawl 52 hinged upon the front wall of the casing and acted upon by a spring 53 holding it constantly in an operative position.

Each accumulating wheel will carry upon its face the usual series of equally spaced figures ranging from zero to nine.

A rod 54 is mounted a short distance beneath the shaft 47 and parallel to the same, the extremities of said rod being mounted fast in the side walls of the casing. Upon the rod 54, there is pivoted a plurality of upwardly extending arms 55 (see Figs. 6 and 7), one less in number than the revoluble members carried by the shaft 47, and disposed in a staggered relation to said members. Between the arms 55, sleeves 56 are mounted upon the rod 54 to hold said arms in their proper spaced relation. Upon the upper extremities of each arm 55, there are integrally formed two arms 57 and 58 which extend laterally in opposite directions. Each arm 57 has rotatably mounted upon its free extremity a roller 59, which is held in constant contact with the face of the adjacent cam 50 by a coiled spring 63 interposed between the front wall of the casing and the upper end of the arm 55. Upon the free extremity of each arm 58 is pivotally mounted a pawl 60, held in constant engagement with the teeth of a ratchet wheel 48 by a coiled spring 61, interposed between said pawl and a bracket 62 projecting at a right angle from the correlated arm 55. The roller 59 and the pawl 60 mounted upon any correlated pair of arms 57 and 58 respectively engage parts 50 and 48 of adjacent revoluble members lying respectively to the right and the left of said pair of arms 57 and 58.

Upon the side of each cam 50, there is mounted a spring-pressed pawl 64, the free end of which is held by the correlated spring contiguous with the adjacent sleeve 51. Upon each sleeve 51 there is mounted fast a small catch 65 disposed closely adjacent to the cam 50 with which one end of the sleeve is contiguous. The construction comprising the parts 64 and 65 is such that when the shaft 47 is subjected to a rotation having its direction the same as that which the revoluble units are adapted to undergo, the members 65 carried by the sleeves 51 will come into contact with the pawls 64 so that the rotation of the shaft 47 will be communicated to all of said revoluble members. In order that the shaft 47 may be manually rotated as described, one extremity of said shaft is allowed to project through one of the side walls of the casing 1, and carries exterior to the casing a knob 65ᵃ. The shaft 47, while adapted to be subjected to manual rotation, will be engaged by its bearings with sufficient firmness that it may not possibly participate in the rotation communicated to any of the revoluble units. The catches 65 mounted upon the sleeve 51 are alined parallel to the shaft 47, and the position of each pawl 64 relative to the figures carried by the correlated accumulating wheel is the same. Thus when the shaft 47 is manually subjected to rotation as has just been described, the accumulating wheels will be brought to such positions that like figures upon all of said wheels will be in alinement.

Just above the shaft 47, the casing 1 is formed with an inclined portion in which portion there is formed an elongated window transverse of the casing. In this window is fitted a strip of glass (see Fig. 1ª) having the nature of a magnifying lens. The size of said window and its relation to the accumulating wheels are such that a number formed by one figure of each accumulating wheel may be seen through the window. Opposite to the carriage 23, the front of the casing 1 is formed with a transverse slot 67 through which projects the shank 68 of a handle 69 rigidly connected with the carriage. By grasping said handle the operator of the machine may shift the carriage 23 from right to left of the casing. An adjustable scale of zeros is provided upon the casing just above the slot 67 as shown in Fig. 1, each zero being disposed directly opposite to one of the ratchet wheels 48. Upon the handle 69 is formed a pointer 70, which for any position of the carriage indicates upon said scale the decimal place of the visible number upon the accumulating wheel which is adapted to be subjected to rotation for such position of the carriage.

The rear ends of the bars 11 respectively have pivotal connection with two bars 71, which are extended rearwardly and then upwardly, their upper ends being normally contiguous with the bar 43, at each side of the key-bars. The bars 71 are supported from the side walls of the casing by a pair of normally vertical swinging links 72.

The modified form of my escapement illustrated in Figs. 8 and 9 constitutes a reversal of the construction embodied in the escapement already described. In accomplishing this reversal, the bar 17 formed with the staggered racks 31 and 33 is mounted parallel to the rods 22 upon the carriage 23, being secured to a bracket 73 formed upon the carriage. The upper extremities of the bars 16 are rigidly connected by a bar 74 carrying a rigidly mounted U-shaped bracket 75. Upon the upwardly projecting portion of said bracket, are respectively mounted the two pawls 30 and 34, the former being normally engaged with the rack 31, and the latter being engageable with the rack 33 through a forward oscillation of the bar 74. In the modified form of escapement, the teeth of the racks 31 and 33 will be pointed oppositely to the rack teeth on the bar embodied in the first described form of my escapement.

An explanation will now be given as to the operation of my adding machine, the mechanism through which the accumulating wheels are actuated by the key-bars being first considered. The variation in the distances from the rear ends of the key-bars to their pivotal points is such that the upward displacement to which the rear ends of said bars may be subjected increases from left to right of the series by a constant distance, this distance being equal to the length of one of the teeth 39. Thus, for example, when the key marked 9 is pressed, the rear end of the correlated key-bar will be elevated a distance equal to the combined length of all nine teeth 39. Hence, any one of the ratchet wheels 48 that may be engaged by the rack 39 will be rotated through nine tenths of its circumference causing the number 9 carried by the correlated accumulating wheel to appear beneath the lens 66, provided, of course, that the number zero of said wheel was beneath said lens before the key was pressed. The particular accumulating wheel affected depends upon the position in which the rack 37 is adjusted. If the accumulating wheel affected did not register at zero when actuated by a certain key, the rotation of the wheel will bring beneath the lens 66 the unit figure of the number constituting the sum of the figure which was originally registered beneath said lens and the number carried by the actuated key. Thus if the number 5 upon a certain accumulating wheel was registered beneath said lens before rotation of said wheel and the rotation of the wheel is actuated by a key carrying the number 6, the number 1 upon said wheel will be brought beneath the lens 66 since 1 is the unit figure of 11 which is the sum of 5 and 6. Since the rack 37 must participate in any vertical displacement to which the frame comprising the parts 41, 42 and 43 is subjected, and since said frame rests upon the rear ends of all key bars excepting that carrying the zero, it is apparent that the rack 37 must be displaced to exactly the same extent as the rear end of any key bar excepting that carrying the zero key. A manipulation of the zero key will not effect the rack 37 since the rear end of the key-bar carrying said key is sufficiently spaced from the bar 43 to avoid contact with the same in its displaced position.

In adding a sum of numbers, all of the accumulating wheels must first be made to register zero beneath the lens 66. This result is accomplished as previously described by grasping the knob 65ª and manually rotating the shaft 47 in the same direction as the ratchet wheels 48 are constrained to rotate. The carriage 23 is then manually shifted to the left until the pointer 70 indicates upon the adjacent scale the decimal place of the first figure in the first number of the sum. Since the rack 37 has been brought into engagement with the ratchet wheel opposite said decimal place upon the scale, when the key carrying the first figure of the first number is pressed, said number will be registered beneath the lens 66 opposite to said decimal place.

The operation of the mechanism for actuating the escapement and producing a step-by-step displacement of the carriage 23 will now be considered. The spacing of the bar 13 from the forward ends of the key-bars is such that when any key is pressed, the correlated key-bar just before reaching the limit of its displacement will communicate a slight downward displacement to the forward end of the frame comprised by the parts 11, 12 and 13. The links 14 will at the same time cause said frame to be displaced slightly in a rearward direction. This rearward motion will be transmitted from said frame to the lower ends of the bars 16, and also the forward ends of the bars 71. The bars 71 in shifting rearwardly will swing the links 72 through a short arc, thereby elevating the upper ends of said bars slightly above their normal positions. The movement to which the bars 16 will be subjected, will have the nature of an angular displacement about the pivots 18. Consequently the bar 17 is subjected to a slight forward displacement sufficient to disengage the rack 31 from the pawl 30, and engage the rack 33 with the pawl 34. While the bar 17 is undergoing this forward displacement, the carriage 23 will be actuated by the spring 28 the distance of half a rack tooth to the right. After this displacement, the carriage will remain stationary during the moment that the displaced key is undergoing its return stroke, permitting the rack bar 37 to fall. As the key-bar and rack-bar reach their normal positions, the member 43 will strike the upper ends of the bars 71, forcing said bars to their normal position, and at the same time forcing the bars 16 and 17, and frame 11, 13, to their normal positions. As the bar 17 shifts rearwardly, the carriage will again travel to the right through a distance equal to half the length of a rack tooth, being restricted from further travel by the rack 31. Thus as the keys carrying the figures of a number are consecutively pressed, the carriage 23 will undergo a step-by-step displacement to the right, each double displacement being sufficient to carry the rack 37 from engagement with one ratchet wheel into engagement with the ratchet wheel next adjacent.

When the modified form of escapement illustrated in Fig. 4ª is used, the teeth of the two racks 31 and 33 are oppositely formed upon the bar 17, while the pawls 30 and 34 are diagonally disposed upon the carriage. When the bar 17 is oscillated, through a displacement of the key-bars, the carriage will undergo a step-by-step displacement as before described.

When the modified escapement illustrated in Figs. 8 and 9 is used, the oscillating movement, which in the first described form of my invention was communicated to the bar 17, will now be communicated to the bar 74 and bracket 75, and the bar 17 will travel with the carriage, limiting the same to a step-by-step displacement as previously described.

It is apparent from the foregoing explanation that after the accumulating wheels have been set at zero, and the keys carrying all of the figures comprising the first number of a sum have been consecutively pressed, said number will appear upon the accumulating wheels beneath the lens 66, and the carriage 23 will be in its right-hand limiting position. The carriage will now be shifted to the left until the pointer 70 indicates upon the adjacent scale the decimal place of the first figure of the second number in the sum. The keys carrying the figures which comprise the second number will now be consecutively pressed, and the carriage 23 will again undergo a step-by-step displacement to the right. As each key is pressed, the accumulating wheel actuated by said key will undergo a rotation such that the unit figure of the sum of the figure previously appearing beneath the lens 66 and the figure carried by the actuating key will now appear beneath said lens 66. When any accumulating wheel completes a revolution, it will actuate the accumulating wheel next adjacent to the left through the tenth part of a revolution, owing to the fact that the cam 50 once in each revolution displaces the correlated arm 55 forwardly sufficient to permit the pawl 60 carried by said arm to travel the length of one tooth upon the ratchet wheel which said pawl engages.

To make the operation of my machine still clearer, we may consider the steps taken to add two simple numbers, as for example 29 and 31. First, by manually rotating the shaft 47, all of the accumulating wheels will be made to register zero beneath the lens 66. The carriage 23 will now be manually shifted to the left until the pointer 70 is over the zero of the adjacent scale just to the right of the decimal point. The keys carrying the figures 2 and 9 are now consecutively pressed, the two accumulating wheels at the right hand of the series thus being made to register the number 29 beneath the lens 66. The carriage is now again manually shifted as before and the keys carrying the figures 3 and 1 are consecutively pressed. As the key carrying the figure 3 is pressed, the accumulating wheel opposite the tenths place on the scale will register the figure 5 beneath the lens. As the key carrying the number 1 is pressed, the accumulating wheel opposite the hundredths place on the scale will complete a revolution and will register zero beneath the lens. Said accumulating wheel in completing a revolution will displace the adjacent accumulating wheel through one tenth of a revolution further causing it to register the figure 6 beneath the lens. Thus the two accumulating wheels together register 60, the sum of the two numbers taken for example.

While the machine shown and described in this application is designed to secure a total having eight figures as a maximum, it is to be understood that by utilizing the same principles of construction a machine may be designed to obtain a total having any number of figures desired. It is also to be understood that the escapement might be readily modified by mounting the bar 17 rigidly upon the carriage and forming the fingers 29$^a$ upon a bracket subjected to an oscillatory movement by the displacement of the key-bars.

The invention is presented as including all such modification and changes as properly come within the scope of the following claims.

What I claim is:

1. In a device of the character described, the combination with an adding machine carriage, of a vertically slidable frame, a vertical rack bar mounted in said frame and participating in its vertical motion, and slidable in said frame parallel to the direction of travel of the carriage, and a member rigidly connected with the carriage, guiding the rack bar in its vertical motion, and communicating to it the horizontal motion of the carriage.

2. In a device of the character described, the combination with an adding machine carriage, of a vertically slidable frame, a vertical rack bar mounted in said frame and participating in its vertical motion, and slidable in said frame parallel to the direction of travel of the carriage, a member rigidly connected with the carriage, guiding the rack bar in its vertical motion, and communicating to it the horizontal motion of the carriage, and a plurality of pivoted key bars upon the rear ends of which said vertically slidable frame normally rests, a displacement of any key bar actuating said frame upwardly.

3. In a device of the character described, the combination with an adding machine carriage, of a vertically slidable rack bar, a member rigidly connected with the carriage, guiding the rack bar in its vertical motion and communicating to it the horizontal motion of the carriage, a rod upon which the rack bar slides with the carriage, a pair of vertically slidable guide members to which said rod is rigidly secured, a horizontal bar rigidly connecting said members beneath said rod, and a plurality of key bars, upon which the frame comprised by said guide member, rod and bar, normally rests, a displacement of any key bar actuating said frame upwardly.

4. In a device of the character described, the combination with an adding machine carriage, of a vertically slidable frame, of a bar mounted in said frame, and participating in its vertical motion, and slidable in said frame parallel to the direction of travel of the carriage, means for communicating the travel of the carriage to the rack bar, means for guiding the rack bar in its vertical sliding displacement, and a plurality of key bars, each actuating said frame upwardly when displaced.

5. In a device of the character described, the combination with an adding machine carriage, of a vertically slidable rack bar, a member rigidly connected with the carriage, guiding the rack bar in its vertical motion and communicating to it the travel of the carriage, and a plurality of key bars each actuating the rack bar vertically when displaced.

In testimony whereof I have signed my name to this specification in the presence of two subscribing witnesses.

JASON B. MOODY.

Witnesses:
S. R. HICKMAN,
JACK A. SCHLEY.